Aug. 16, 1966     D. K. SLOSBERG ETAL     3,267,187
TEXTURED SHEET MATERIAL
Filed Oct. 10, 1963

INVENTORS
DAVID K. SLOSBERG
LAURENCE F. HAEMER
ERNEST R. HOLMSTROM

ATTORNEYS

United States Patent Office 3,267,187
Patented August 16, 1966

3,267,187
TEXTURED SHEET MATERIAL
David K. Slosberg, Yardley, and Laurence F. Haemer and Ernest R. Holmstrom, Morrisville, Pa., assignors to American Biltrite Rubber Co., Inc., Trenton, N.J., a corporation of Delaware
Filed Oct. 10, 1963, Ser. No. 315,196
2 Claims. (Cl. 264—122)

Our invention relates to novel decorative sheet materials having a textured effect. In particular our invention concerns thermoplastic surface coatings and floor tile products having a varied surface texture or pebble effect.

There has been an increasing demand for floor tile products and decorative sheet materials characterized by a surface in which all or a portion of the individual pigmented particles stand out to give a slightly raised or textured surface effect. Present thermoplastic sheet materials obtain a synthetic textured effect by embossing the sheet material or by sprinkling thermoplastic resin chips on the surface and subsequently calendering the sheet material.

It, therefore, conventionally requires one or more subsequent operations to produce a surface textured effect on thermoplastic sheet material. Hot pressing to form the thermoplastic sheet also tends to promote a flattening and lateral spread of thermoplastic pigmented chips in the resin sheet. Sheet material and floor tile products with an irregular, raised, natural-looking pebble or surface texture effect alone or with a three-dimensional effect are usually difficult to obtain without additional costly operations.

It is, therefore, an object of our invention to provide a sheet material and method of preparing such material in which a natural-looking, irregular surface texture may be obtained without the need for a subsequent embossing or calendering operation after the forming of the sheet material.

Another object of our invention is to provide a wear-resistant, decorative floor tile product having a raised surface textured effect.

Another object of our invention is to provide a floor tile product containing compressible granules embedded in a thermoplastic resin which granules do not tend toward lateral flow during hot pressing.

Other objects and advantages of our invention will be apparent to those skilled in the art from the following detailed description of our invention taken with the accompanying drawings wherein.

We have found that the use of deformable or compressible rubber in granular form in a thermoplastic matrix permits textured and unusual design effects to be obtained. With both blown and unblown rubber granules, the rubber is cured or vulcanized before it is blended with the thermoplastic resin matrix material. These cured granules being no longer of a thermoplastic nature, there is obtained little or no substantial flow of these granules during the later stages of processing of the matrix material. For instance, these cured rubber granules on subsequent extrusion, calendering, embossing, hot pressing operations or other processing operations conducted at high pressures or elevated temperatures, tend to resist lateral flow in the sheet which would change their shape, while the thermoplastic matrix material might tend to lateral displacement, flow, or fusion during the same operation. Thus after a hot pressing operation these compressible rubber granules tend to return to their original shape unlike thermoplastic granules. What little distortion takes place on these granules during these operations may be relieved by an inexpensive and easily performed annealing step in which the sheet material is subjected to an elevated temperature of, for example, 250° to 300° F. for about one to five minutes. This heat treatment is for a sufficient time and temperature to relieve any distortion on the granules, and to permit the granules to return to their undistorted, original shape. On annealing, the granules stand out individually on the thermoplastic sheet and in blown, more compressible, low density granules may even expand slightly to increase the surface texture effect. Annealing also reduces unresolved strains in the fused thermoplastic matrix.

The rubber granules when incorporated into a plasticized transparent vinyl resin matrix, such as polyvinyl chloride, are capable of being deformed by pressure without flow, and will recover substantially their original granular shape on the release of the pressure or heating. These granules of various preformed regular or irregular shapes or sized when dispersed in a thermoplastic matrix permit the matrix to be molded to the desired shape under heat or pressure. Subsequent annealing, while not absolutely necessary, depending upon the temperature at which the sheet is removed from the hot pressing, is the preferred method. When blown or unblown cured rubber granules are dispersed in a transparent vinyl resin matrix and formed into a sheet material used alone or as the top layer of a floor tile product, a very desirable pebbled, surface textured design, together with a three-dimensional effect, is obtained.

Figure 1:
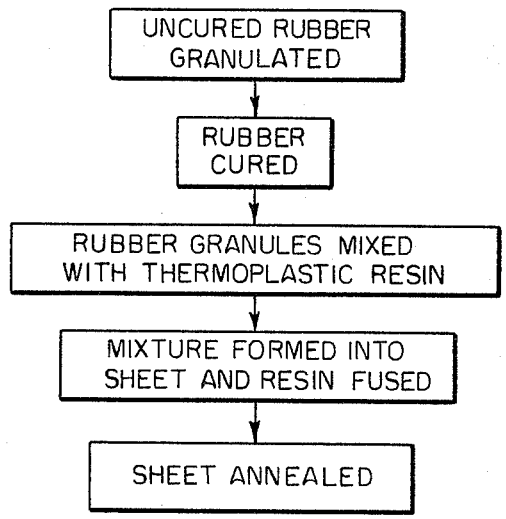
FIGURE 1 is a schematic flow diagram illustrating one method of preparing floor tile material having a surface texture effect in accordance with our invention.

FIGURE 1 illustrates one embodiment of our invention in which an uncured rubber capable of being cured to a thermosetting, pressure-resistant, deformable granular product is provided in granular or subdivided particle form. The rubber may be crumb rubber coagulated from latex or precipitated from a solvent solution or may be a rubber product granulated, shredded, abraded, chopped, ground, diced or otherwise placed in a predetermined particular form of desired shape and size. It has been found that granules having an average diameter of between $1/16$ to $1/4$ of an inch usually give good results. Where blown granules are to be used, a chemical blowing agent having a decomposition temperature above the temperature of the initial mix is thoroughly admixed with the rubber prior to granulation.

For instance, the uncured rubber in sheet or bulk form may be granulated between rotary and stationary knives, and the granulated particles of the desired size permitted to fall through a screen. The rubber may be irregular chips, spheres, or diced or any other shape. The average size of the granules bears a relationship to the ultimate thickness of the sheet material to be produced. Granules of substantially greater size than the sheet thickness should not be used, although some of the granules may be slightly greater than the sheet thickness. With sheet thicknesses of $1/8$ to $1/4$ inch, granules of $1/4$ inch or under are suitable. Where a pronounced texture effect is desired the rubber granules should be chunky, since very thin flakes or thin, flat chips reduce the texture effect.

Blown rubber granules tend to give a more resilient sheet material in which the granules are fuller in body and shape. The pebble effect produced by blown granules tends to give a smoother, rounder pebble effect to the decorative surface. Unblown rubber granules are somewhat harder, i.e. less compressible and more resistant to deformation than the blown granules, and often do not yield as pronounced surface texture effects. Further, these granules are often characterized by a sharp, flatter chip or pebble design in the decorative coating.

The granulated uncured rubber granules are then cured and cross-linked in a conventional manner, such as by elevated temperatures, curing agents or a combination thereof to provide cured rubber granules. Where blown rubber granules are to be employed, the uncured rubber is cured under thermal conditions sufficient to decompose the blowing agent, and provide cured cellular or sponge rubber granules of predetermined density and size. For example, blown granular rubber may be cured at 300° to 350° F. for five minutes to one hour. In one embodiment, uncured rubber containing a blowing agent such as azodicarbonamide is cured by high pressure steam in an autoclave.

The temperature of the steam and the time period in the autoclave is selected such that the rubber granules will vulcanize and decompose the blowing agent. Since the granules are under pressure in the autoclave, the gas from the blowing agent is trapped within each individual granule causing the granules to expand after the pressure is released. The cell structure of the blown granules normally is discontinuous with the absence of a surface skin, although neither is an absolute requirement of the blown granules. Where blown granules are to be used, the blowing agent should be dispersed in the uncured rubber prior to granulation. For example, the blowing agent should be dispersed in the rubber prior to its formation into sheet or crumb form, to provide efficient expansion of the granules under curing conditions.

The cured rubber granules are then dried and admixed with a thermoplastic resin which serves as a matrix material. Unusual design and depth effects are obtained on using transparent resins. However, any thermoplastic resin either transparent, opaque, translucent or pigmented with one or a plurality of different colors may be employed. The cured rubber particles can be incorporated into a fused batch of thermoplastic material on a roller mill, in an internal mixer, such as a Banbury mixer, an extruder, on calender rolls, or other suitable blending means. The cured rubber may be mixed into a plastisol or organosol, and subsequently formed and fused. We have found the blending of the cured rubber granules with dry thermoplastic resins in the form of fine powder or small chips gives good results. For example, cured rubber particles can be admixed with a dry blend of a transparent plasticized thermoplastic vinyl resin, which blend is prepared by granulating vinyl sheet material into fine chips. The cured rubber particles may be permitted to fall from one conveyor belt to another conveyor belt carrying the resin chips to provide a random distribution of rubber and resin particles of a predetermined thickness the width of the moving belt. The exact blend of rubber granules and thermoplastic resin depends on the properties and design effects desired in the ultimate product. However, we have found that blends of from about 2% to a maximum of about 80% rubber granules can be employed with the usual blends containing 30% to 60% rubber granules. Excellent results have been obtained with a dry blend of 50–50 chlorosulfonated polyethylene rubber granules and transparent plasticized polyvinyl chloride resin chips.

The dry blend of rubber and resin is formed into the desired shape by pressure, temperature or combinations thereof in which the resin is molded and formed. For example, the thermoplastic resin in the blend is fused into a sheet material by hot pressing. Temperatures of 300° to 350° F. and molding pressures of about 25 to 2,000 p.s.i. are employed to fuse the resin into a continuous matrix material. The forming of the sheet material and the fusing of the resin may be accomplished by extrusion, calendering, molding, hot pressing or other means. For example, the dry powder blend can be molded in a press at elevated temperatures until the resin particles fuse, then the molded material is cooled and removed.

Hot pressing forms sheet material containing a fused thermoplastic resin matrix with compressible cured rubber particles embedded through the matrix. In a hot pressing operation, the rubber granules may be compressed or deformed so that the sheet material may be smooth on cooling and removing from the press. When the sheet is taken out of the press hot, e.g. 100° to 250° F., a texture effect is apparent, while cooling the sheet material to less than 150° F. prior to removal from the press may require a subsequent annealing operation to provide the desired texture effect. Thus depending on the temperature at which the sheet material may be removed from the press without deformation, determines in some measure the degree of texture effect and whether annealing is required for a full texture effect. Good results have been obtained with heat platens at 350° F. with the sheet on a seven-minute heating and seven-minute cooling cycle and removed from the press at 100° to 160° F.

For decorative, wear-resistant, surface-coating applications, the sheet material so prepared commonly has a thickness of from ⅛ to ⅜ of an inch. The heat and pressure employed to form and fuse the matrix has little, if any, distortion effect on the cured rubber particles which do not exhibit flow during these operations. These rubber particles, therefore, individually stand out and are very slightly raised above and on the surface of the sheet material although they are firmly embedded in the matrix and have a thin matrix top coating. The effect produced in a transparent resin is to create a relatively flat sheet surface with small, irregular undulations in the surface representing all or a part of the individual rubber granules. This surface texture effect with the transparent resin imparts a three-dimensional pebble effect to the covering.

If desired or required the sheet material as prepared may be subject to an annealing step in which elevated temperatures of about 150° to 300° F. are used to relieve what unrelieved distortions the granules were subject to during the forming operation. The annealing of the sheet material permits these distortions of the rubber granules to be relieved thereby promoting a maximum surface texture effect. Good results have been obtained by annealing sheet material of our inventions from 180° to 260° F. for one to three minutes. After annealing, the sheet material may then be employed in a conventional manner as a floor tile sheet product. For example, the sheet material may be cut and used alone or bonded by hot pressing or by an adhesive resin tie-in coat, such as a white or pigmented tie-in coat, to a resin or asphalt-saturated asbestos or other base sheet material.

Figure 2:
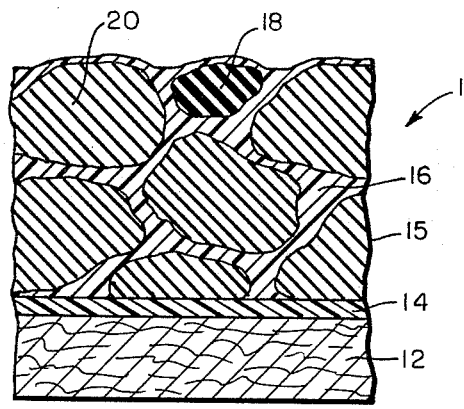
FIGURE 2 is an enlarged cross-sectional view of a composite floor tile product of one embodiment of our invention.

FIGURE 2 illustrates an enlarged cross-sectional view of a floor tile product 10 which comprises a nonwoven asbestos base sheet 12, a tie-in adhesive resin coat 14 and a decorative top coat 15. The asbestos base may comprise an asbestos sheet material to which a polychloroprene or other rubber latex had been added to the beater slurry of the asbestos fiber to provide a polychloroprene saturated asbestos base. A thin resin tie-in coat 14 of a dried adhesive resin, such as an acrylate resin, provides a means of adhering the base 12 to the top coat 15. This resin coat provides a barrier layer to prevent migration of harmful materials from the base coat 12 to the top coat 15, which materials might tend to stain the top coating appearance. The tie coat may be a clear resin or a white or colored pigmented resin coat. Where a transparent resin matrix is used, a white resin tie-in coat is often used to provide a background for viewing the rubber granules, where the background is visible, and to enhance the depth effect of these granules in the matrix. The top coat 15 includes a transparent thermoplastic fused resin matrix 16 containing uniformly dispersed therein a plurality of small, opaque, cured, compressible, blown rubber granules 18 and 20 of different pigmented color or hue. The outline of the resilient rubber granules at or near the top surface of the coating protrudes individually in whole or in part slightly above the matrix surface to form an irregular, very slightly raised, textured surface. This surface, when viewed sideways or slightly above the horizontal plane of the material, is characterized by an undulating or a pebble surface of pleasing design. These granules are more rounded and lower density than the granules 38 and 40 of FIGURE 3. The mere pressure-deformable nature of these granules and the use of an annealing step tends to provide a good surface texture and depth perception effect.

Figure 3:
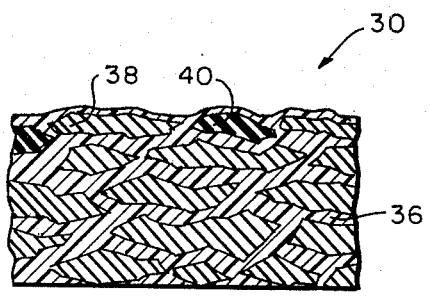
FIGURE 3 is an enlarged cross-sectional view of another embodiment of the sheet material of our invention.

FIGURE 3 illustrates an enlarged cross-sectional view of another sheet material which includes a hot-pressed, decorative, wear-resistant, plasticized, thermoplastic vinyl resin sheet 30. The sheet 30 comprises a transparent, fused, plasticized, vinyl resin matrix 36 which contains, uniformly dispersed and embedded therein, cured flat rubber granules or chips 38 and 40 of different opaque coloring.

If desired, cured rubber granules of both a blown and an unblown nature may be employed in combination or in combination with conventional pigmented thermoplastic chips. In some embodiments where the depth effect is desired to be highlighted or where a very thin or no white or pigmented background coat used as shown in FIGURE 2, the rubber granules may be placed in the sheet with the larger size particles near or at the time of the transparent resin matrix and the smaller rubber granules covering the underlying lower areas and especially the area visible through the individual larger granules. In this manner, due to the larger granules nearer the surface with the smaller particles nearer the bottom of the sheet, an enhanced three-dimensional effect is created.

Rubbers which may be employed in our invention include any rubbery product or rubbery polymers such as natural and synthetic elastomers capable of being cured and, after vulcanizing, which are compressible and resistant to deformation or flow by heat or pressure, at least within the range of the pressure and temperatures employed in processing the thermoplastic matrix resin.

Suitable elastomers or rubber would include, but not be limited to, those polymeric produces exhibiting elastomeric properties and capable of being cured or vulcanized, such as those rubbery polymers having ethylenically unsaturated linkages such as conjugated dienes. Rubber polymerizates may be hydrocarbon polymers such as conjugated 1,3 dienes, and may contain small amounts of cross-linking monomers like divinyl benzene and be an oil extended rubber. Suitable specific rubbers would include, but not be limited to: natural rubber; copolymers of a diene and a vinyl aromatic such as styrene and a conjugated diene like butadiene; polymers of halogenated dienes like polychloroprene; copolymers of $C_4$–$C_8$ diolefin and a $C_4$–$C_8$ monolefin such as copolymers of isobutylene and isoprene commonly referred to as butyl rubber, for example, containing 80 to 99.5 weight percent isobutylene and 0.5 to 20 weight percent isoprene; halogenated butyl rubber such as brominated and chlorinated butyl rubber; polydienes such as polybutadiene, polyisoprene, etc.; copolymers of ethylene and propylene and terpolymers containing a $C_4$–$C_{12}$ diene like dicyclopentadiene; copolymers of dienes and organic unsaturated nitriles like butadiene and acrylonitrile and methylacrylonitrile; copolymers of dienes with vinyl, vinylene, and vinylidene organic monomers like acrylates such as methyl acrylate and methyl methacrylate with butadiene; urethanes prepared by the reaction of diisocynates with a polyhydric compound such as toluene diisocynate with polyalkylene ether glycols; polysulfides; rubbery epoxy polymers, halosulfonated $C_2$–$C_3$ polyalkylenes like chlorosulfonated polyethylene and the like and combinations thereof.

The rubber polymerizates may contain additives such as: fillers like asbestos, glass, silica, clay, carbon black, talc, limestone, etc.; antioxidants; dyes; pigments like metal oxides such as zinc oxide, titanium oxide, magnesium oxide; lubricants like hydrocarbon oils, waxes, glycols, fatty acids, etc.; solvents; stabilizers like metal soaps such as barium and cadmium stearates; accelerators like mercaptobenzothiazole, diorthotolyl guanidine, imidazolines, metal dialkyl thiocarbamates like iron and zinc dimethyl dithiocarbamate, etc.; activators like zinc oxide; and curing or vulcanizing agents like sulfur, organic peroxides like 2,5-dimethyl-2,5-di(t-butylperoxy) hexane, dicumyl peroxxide, and 2,5-dimethyl-2,5-di(t-butylperoxy) hexyne-3, metal oxides, etc., and combinations thereof. Curing may also be effected by radiation by gamma rays from a cobalt source, etc.

Typical formulations for the elastomeric granules are, as follows:

I.

| | |
|---|---|
| Chlorosulfonated polyethylene | 100 |
| Styrene butadiene copolymer (85% styrene) | 25 |
| Styrene butadiene copolymer (23% styrene) | 50 |
| Hydrated silica | 60 |
| Ground limestone | 100 |
| Zinc oxide | 5 |
| Barium-cadmium stearate | 2 |
| 2,5 bis (tert butyl peroxy) 2,5-dimethyl hexane | 4 |
| Polyethylene glycol (MW 4000) | 2 |

II.

| | |
|---|---|
| Styrene butadiene copolymer (23% styrene) | 100 |
| Styrene butadiene copolymer (85% styrene) | 20 |
| Coumarone indene resin | 20 |
| Hydrated silica | 60 |
| Precipitated calcium carbonate | 100 |
| Petroleum oil | 10 |
| Zinc oxide | 5 |
| Mercaptobenzothiazole | 3.0 |
| Diorthotolyl guanidine | 1.5 |
| Zinc dimethyl dithio-carbamate | 0.7 |
| Polyethylene glycol (MW 4000) | 3.0 |
| Sulfur | 2.0 |

III.

| | |
|---|---|
| Polychloroprene | 100 |
| Magnesium oxide | 2 |
| Clay | 200 |
| Mineral oil (aromatic) | 25 |
| Zinc oxide | 3 |
| 2-mercapto imidazoline | 0.75 |

Where blown rubber granules are used, any conventional method or means of producing the blown granules may be employed. Chemical blowing agents which generate an inert blowing gas of nitrogen, carbon dioxide, etc., above a decomposition temperature, are useful. Suitable blowing agents include, but are not limited to: azobisformamide; N,N' - dinitrosopentamethylenetetramine; diazoaminobenzene; N,N'-dimethyl-N,N'-dinitrosoterephthalamide; and the like. The agent employed should not decompose below the mixing temperature of the rubber granules, such as not below about 250° F. Depending upon the density of the rubber desired, the blowing agent may be used in from one to thirty parts of agent per 100 parts of rubber. The blowing agents may include or be dispersed or in solutions of hydrocarbon oils, plasticizers, etc., alone or in combination with activators and stabilizers. The agent or composition may be added to a solvent solution of the uncured rubber prior to precipitation or in emulsified form to a rubber latex prior to coagulation. The amount of agent to be used depends on the density of the rubber granules and the compressibility characteristic desired.

The thermoplastic resin employed as the matrix material may be any thermoplastic, natural or synthetic, resinous or polymeric, material capable of being formed by heat or pressure, such as in hot pressing. The thermoplastic matrix may comprise plasticized, homo or co-polymerized vinyl resins of the polymer, with or without mineral fillers. Suitable thermoplastic polymers include, but are not limited to: polyvinyl halides like polyvinyl chloride; copolymers of vinyl chloride with vinyl esters such as short chain, fatty acids like 2 to 15 weight percent of vinyl acetate; polyvinyl esters; vinylidine halides like poly vinylidine chloride and copolymers with vinyl chloride, vinyl acetate, acrylonitrile, etc; vinyl aromatics like polystyrene, copolymers of styrene and acrylonitrile, styrene and methyl methacrylate, etc.; $C_2$–$C_4$ poly alkylenes like polyethylene, polypropylene, halogenated alkylenes like chlorinated polyethylene; cellulose esters like cellulose acetate and cellulose acetate butyrate; ethyl cellulose, and other thermoplastic resins derived from monoethylenically carbon-to-carbon, unsaturated monomers susch as vinyl, vinylene, and vinylidene containing monomers and copolymers.

These thermoplastic resins may contain fillers, heat and light stabilizers, pigments, dyes, antioxidants and other additives. Plasticizers such as phosphoric acid esters like tricresyl phosphate, phthalic anhydride esters like dibutyl phthalate, dioctyl phthalate, octyl decylphthalate, adipic acid esters like di(2-ethyl hexyl) adipate, azelaic acid esters, oleic acid esters, sebacic acid esters, etc., may be employed to plasticize the resin. Unfilled transparent plasticized vinyl resins such as polyvinyl chloride and vinyl chloride-vinyl acetate have been found to be good matrix resins for the sheet material of our invention.

Our invention permits unusual, random and novel surface design features to be imparted to sheet materials. Our invention provides sheet material and floor tile decorative surfaces with a surface texture pattern. The employment of cured, blown or unblown, compressible rubber granules in a thermoplastic matrix permits the matrix to be molded under heat and pressure while the rubber granules recover their original shape. Cured rubber granules in a transparent vinyl resin matrix provide a textured surface design and a pebble, three-dimensional effect.

What we claim is:
1. A method of preparing sheet material having a textured surface effect which method comprises:
preparing a dry blend mixture comprising thermoplastic vinyl chloride resin particles and from about 30 to 60 percent by volume of compressible, thermoset, rubbery elastomer particles;
pressing said blend into a sheet material at a temperature sufficient to form a fused, continuous thermoplastic matrix with the elastomer particles dispersed therein;
cooling said sheet material while in the pressing operation to a temperature of less than about 150° F.;
removing said sheet material from the pressing operation; and
thereafter heating said sheet material to a temperature of about 180 to 250° F. for about 1 to 3 minutes, to produce a sheet material characterized by a textured surface effect having individual, raised elastomer particles.

2. A method of preparing sheet material having a textured surface effect which method comprises:
preparing a dry blend comprising a mixture of thermoplastic resin particles and from about 2 to 80 percent by volume of compressible, thermoset, rubbery elastomer particles;
pressing said blend into a sheet material at a temperature sufficient to form a fused, continuous, thermoplastic matrix with the elastomer particles dispersed therein;
removing said sheet material from the pressing operation at a temperature of less than about 150° F., the sheet material so removed being characterized by a smooth surface; and
thereafter heating the smooth surface sheet material to a temperature of from about 150° F. to 300° F. to provide a sheet material having at least one surface thereof characterized by a textured surface effect of raised individual elastomer particles.

References Cited by the Examiner
UNITED STATES PATENTS

| | | |
|---|---|---|
| 2,678,081 | 5/1954 | Rainard et al. |
| 2,744,291 | 5/1956 | Stastny et al. |
| 2,763,208 | 9/1956 | Rockoff et al. |
| 2,823,156 | 2/1958 | Hedges. |
| 2,835,620 | 5/1958 | Bartlett. |
| 2,843,883 | 7/1958 | Rockoff. |
| 2,882,327 | 4/1959 | Roberts. |
| 2,987,102 | 6/1961 | Heinrichs _____ 161—254 X |
| 3,015,640 | 1/1962 | Weaver et al. _____ 264—175 X |
| 3,041,193 | 6/1962 | Hamway et al. _____ 260—2.5 |
| 3,083,124 | 3/1963 | Rahmes. |
| 3,175,985 | 3/1965 | Lightner et al. ____ 260—892 X |

ALEXANDER WYMAN, *Primary Examiner.*

MORRIS SUSSMAN, EARL M. BERGERT, *Examiners.*

UNITED STATES PATENT OFFICE
CERTIFICATE OF CORRECTION

Patent No. 3,267,187                          August 1, 1966

David K. Slosberg et al.

It is hereby certified that error appears in the above numbered patent requiring correction and that the said Letters Patent should read as corrected below.

Column 8, line 10, for "of form about 180 to 250° F. for about 1 to 3" read -- of from about 180 to 250° F. from about 1 to 3 --.

Signed and sealed this 1st day of August 1967.

(SEAL)
Attest:

EDWARD M. FLETCHER, JR.                      EDWARD J. BRENNER
Attesting Officer                                       Commissioner of Patents